(12) United States Patent
Aflalo et al.

(10) Patent No.: US 10,628,949 B2
(45) Date of Patent: Apr. 21, 2020

(54) IMAGE PROCESSING WITH ITERATIVE CLOSEST POINT (ICP) TECHNIQUE

(71) Applicant: SAMSUNG ELECTRONICS CO., LTD., Suwon-si, Gyeonggi-do (KR)

(72) Inventors: Yonathan Aflalo, Tel Aviv (IL); Nathan Henri Levy, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/845,128

(22) Filed: Dec. 18, 2017

(65) Prior Publication Data

US 2019/0188872 A1 Jun. 20, 2019

(51) Int. Cl.
| | |
|---|---|
| *G06T 7/33* | (2017.01) |
| *G06T 7/593* | (2017.01) |
| *G06T 3/00* | (2006.01) |
| *H04N 13/128* | (2018.01) |
| *H04N 13/271* | (2018.01) |
| *H04N 13/282* | (2018.01) |

(52) U.S. Cl.
CPC ............ *G06T 7/337* (2017.01); *G06T 3/0068* (2013.01); *G06T 7/593* (2017.01); *G06T 2207/10028* (2013.01); *G06T 2207/20221* (2013.01); *H04N 13/128* (2018.05); *H04N 13/271* (2018.05); *H04N 13/282* (2018.05)

(58) Field of Classification Search
CPC ....... G06T 7/337; G06T 3/0068; G06T 7/593; G06T 2207/10028; G06T 2207/20221; H04N 13/128; H04N 13/271; H04N 13/282

See application file for complete search history.

(56) References Cited

U.S. PATENT DOCUMENTS

| | | | |
|---|---|---|---|
| 5,471,567 A * | 11/1995 | Soderberg | ............. G06T 15/503 345/422 |
| 7,187,809 B2 | 3/2007 | Zhao et al. | |
| 8,401,242 B2 | 3/2013 | Newcombe et al. | |
| 9,430,847 B2 | 8/2016 | Ramalingam et al. | |
| 2015/0363938 A1* | 12/2015 | Ramalingam | ............ G06K 9/52 382/103 |
| 2016/0321838 A1* | 11/2016 | Barone | .............. H04N 1/00827 |

FOREIGN PATENT DOCUMENTS

WO 2015/190269 12/2015

\* cited by examiner

*Primary Examiner* — John W Lee
(74) *Attorney, Agent, or Firm* — F. Chau & Associates, LLC

(57) ABSTRACT

In various embodiments of an image processing method and apparatus, first and second point clouds representing respective images of a scene/object from different viewpoints are obtained. Extracted features points from the first point cloud are matched with extracted feature points from the second point cloud, using depth based weighting, as part of an ICP initiation process. The first and second point clouds are then further ICP processed using results of the initiation process to generate at least one coordinate-transformed point cloud.

15 Claims, 6 Drawing Sheets

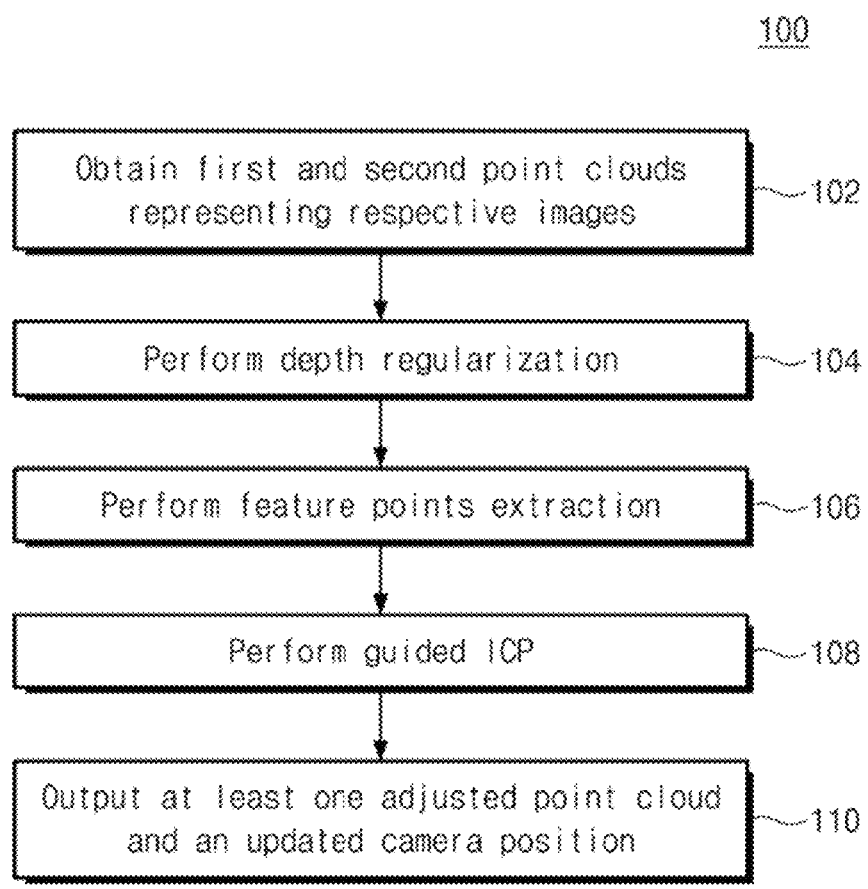

POINT CLOUD IMAGE

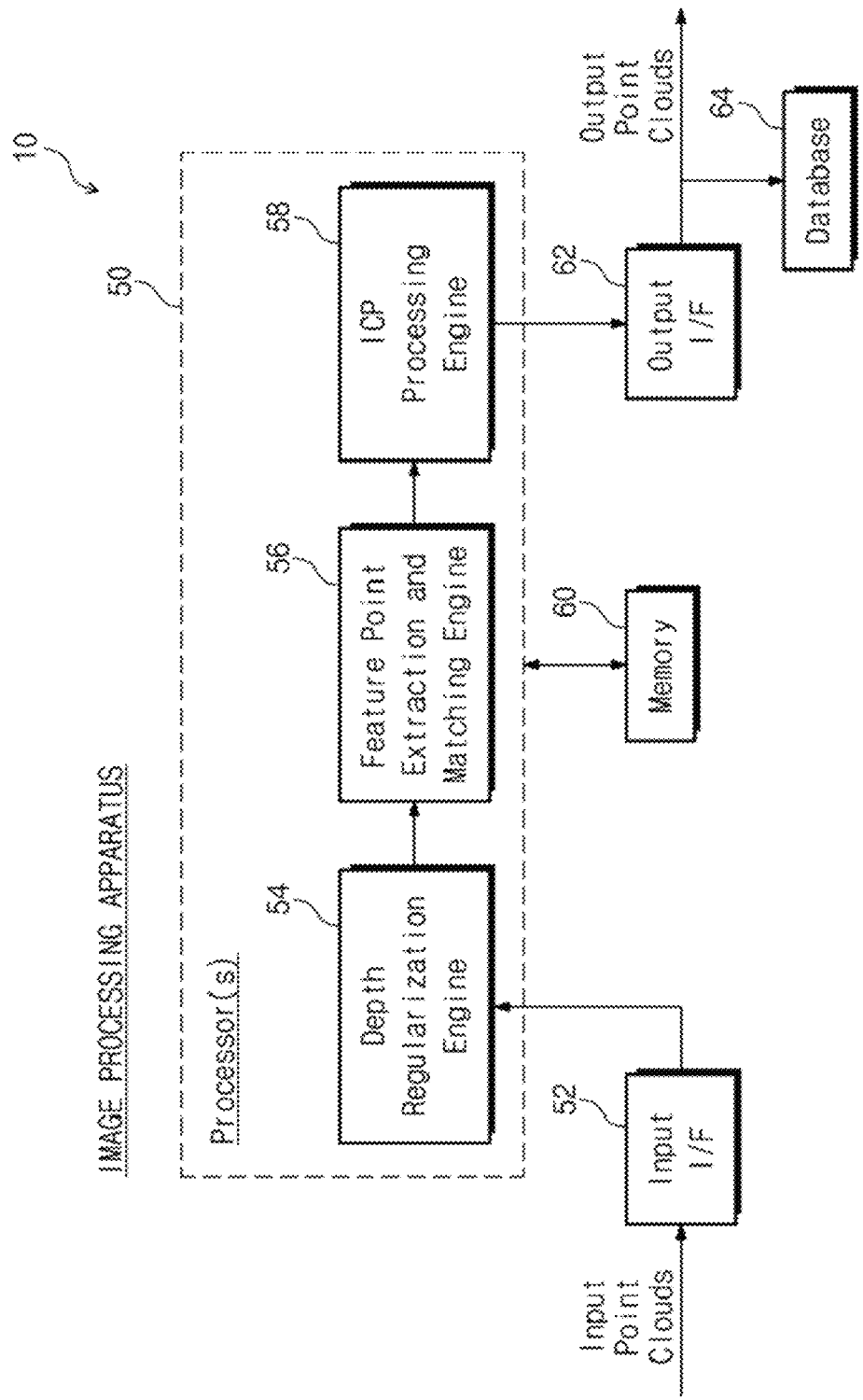

IMAGE PROCESSING WITH ITERATIVE CLOSEST POINT (ICP) TECHNIQUE

TECHNICAL FIELD

The present disclosure relates generally to image processing, and more particularly to image processing of images obtained by a depth camera using an iterative closest point (ICP) technique.

DISCUSSION OF THE RELATED ART

Iterative Closest Point (ICP) is an algorithm employed to minimize the difference between two clouds of points. ICP is often used to reconstruct 2D or 3D surfaces from different scans in medical imaging, 3D rendering of real world objects, localizing robots, and so forth.

In ICP-based image processing, one point cloud, often called the reference cloud, is kept fixed, while the other point cloud undergoes a coordinate transformation for a best match to the reference cloud. The classical ICP algorithm can be summarized as follows:

Given first and second point clouds P and P', which may represent respective images of an object or scene taken from a camera from different vantage points:

For each point $p_i \in P$:

First, find the closest point $q_i = p'_{c(i)} \in P'$.

Next, find rotation R and translation t that minimizes $\Sigma_i [Rp_i + t - q_i]^2$.

Then, update the position of all the points p of P according to $p_{new} = Rp + t$.

Finally, reiterate until convergence.

Accordingly, ICP iteratively revises a transformation based on a combination of rotation and translation, to minimize errors in distances between the corresponding points of the first and second point clouds. Thereby, the reference (first) point cloud, and the coordinate-transformed second point cloud, become substantially aligned.

While ICP is a valuable tool in various image processing applications, conventional ICP has been found to be imprecise under certain conditions.

SUMMARY

An image processing method and apparatus may employ depth-based weighting in an iterative closest point (ICP) process to generate a coordinate-transformed point cloud.

In various embodiments of a method and apparatus according to the technology, first and second point clouds representing respective images of a scene/object from different viewpoints are obtained. Extracted features points from the first point cloud are matched with extracted feature points from the second point cloud. An initial rotation and translation of the first point cloud with respect to the second point cloud may be determined, to initially align the first and second point clouds, using depth-based weighting of the feature points. ICP processing may then be performed using the initial rotation and translation, to generate at least one coordinate-transformed point cloud.

Each of the first and second point clouds may be a point cloud obtained from a stereo camera.

The ICP processing may involve performing a depth weighted based alignment of corresponding points of the first and second point clouds, where points at depths closer to a viewpoint are weighted higher than points further from the viewpoint.

Depth regularization may be performed on each of the first and second point clouds prior to the matching of the feature points.

In an aspect, an electronic device includes memory and at least one processor coupled to the memory. The at least one processor executes instructions to: perform depth regularization on each of first and second point clouds; determine an initial rotation and translation of the first point cloud with respect to the second point cloud to initially align the first and second point clouds; and perform iterative closest point (ICP) processing using the initial rotation and translation, to generate at least one coordinate-transformed point cloud.

In another aspect, a system includes: at least one camera configured to capture images of a scene from each of first and second viewpoints and obtain, respectively, first and second point clouds corresponding to the scene; and image processing apparatus including memory and at least one processor coupled to the memory. The at least one processor may execute instructions to: match feature points extracted from a first point cloud with feature points extracted from a second point cloud; determine an initial rotation and translation of the first point cloud with respect to the second point cloud to initially align the first and second point clouds, using depth-based weighting of the feature points; and perform iterative closest point (ICP) processing using the initial rotation and translation, to generate at least one coordinate-transformed point cloud.

In still another aspect, a non-transitory computer-readable recording medium stores instructions that, when executed by at least one processor, implement an image processing method. The method may include: obtaining first and second point clouds representing respective images of a scene from different viewpoints; matching feature points extracted from the first point cloud with feature points extracted from the second point cloud; determining an initial rotation and translation of the first point cloud with respect to the second point cloud to initially align the first and second point clouds, using depth-based weighting of the feature points; and performing iterative closest point (ICP) processing using the initial rotation and translation, to generate at least one coordinate-transformed point cloud.

BRIEF DESCRIPTION OF THE DRAWINGS

The above and other aspects and features of the present technology will become more apparent from the following detailed description, taken in conjunction with the accompanying drawings in which like reference numerals indicate like elements or features, wherein:

FIG. 2 is a flow chart illustrating an illustrative method for processing image point clouds in accordance with an embodiment of the present technology;

FIG. 5 is a functional block diagram of an example image processing apparatus 10 according to the present technology.

DETAILED DESCRIPTION

The following description, with reference to the accompanying drawings, is provided to assist in a comprehensive understanding of certain exemplary embodiments of the new technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person or ordinary skill in the art.

The present technology may use an enhanced ICP-based processing approach to find rotation and translation of a camera between positional states at which first and second image frames are captured. The framework may be adapted to stereo based depth from a dual camera sensor. The depth information may be synchronized with gray information that can be coupled with the ICP process.

The present technology may use a method to smooth a depth map and to weight every 3D point contribution to an ICP process with parameters from a stereo system. Gray level information may be used to improve classical ICP.

The present technology may build a 3D point cloud and compute a camera motion from a pair of stereo camera sensors that each produce depth information.

Hereinafter, for ease of explanation, processing operations of the present technology will be described as occurring at the pixel level. A pixel, however, is but one example of an image element, Thus, the below-described processing may alternatively be performed using larger image element units, such as macroblocks, rather than pixels. The use of larger image elements may reduce processing complexity but at the expense of accuracy/resolution.

Figure 1:
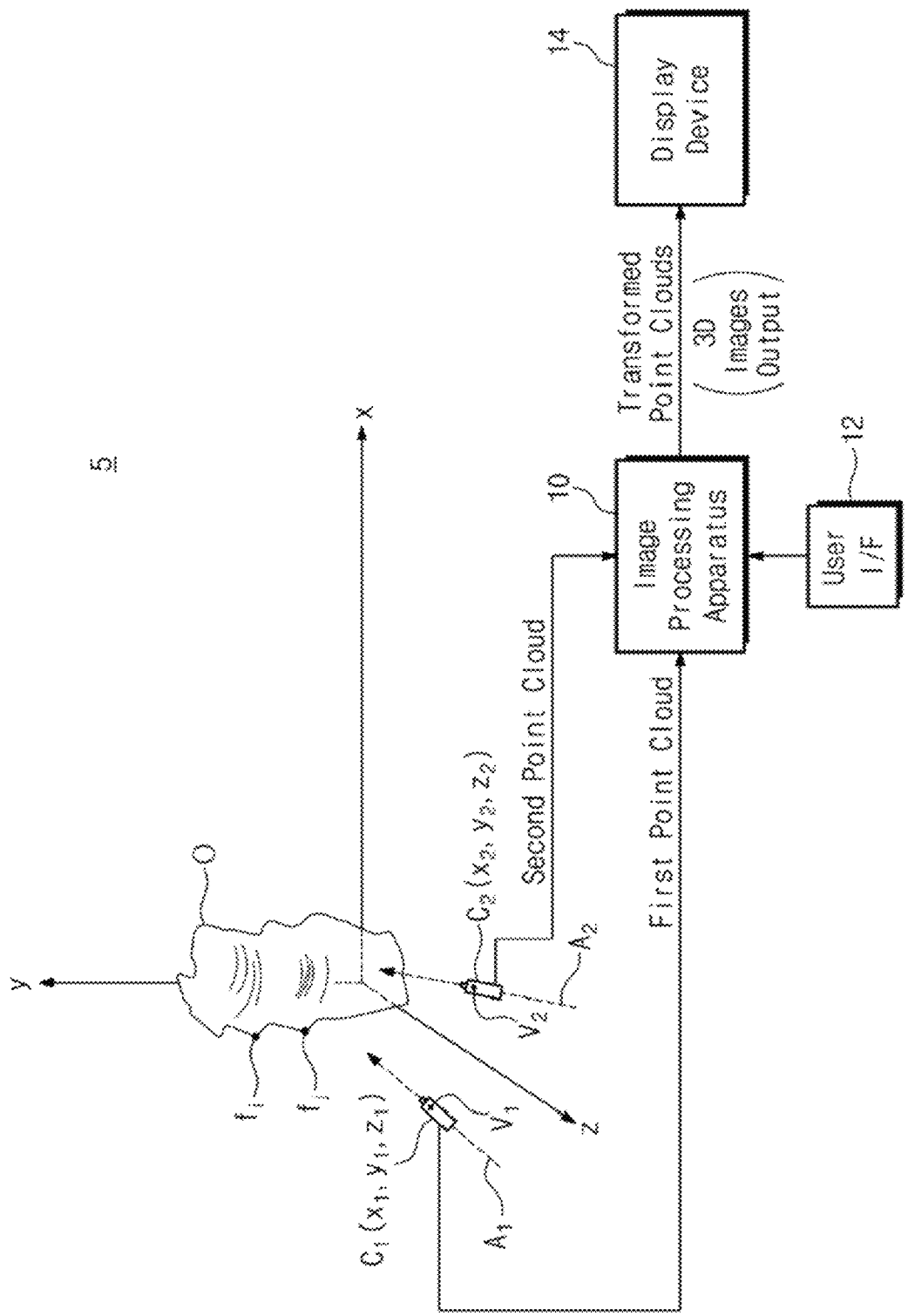
FIG. 1 illustrates an example system according to the present technology.

FIG. 1 is an example system 5 according to the present technology. System 5 includes a first camera $C_1$ located at a first position $x_1$, $y_1$, $z_1$ in three dimensional space. First camera $C_1$ may be a depth camera, which is a camera capable of measuring depth of image elements in a scene as well as capturing the scene's image information, Preferably, first camera $C_1$ is a stereo camera or a pair of cameras functioning as a stereo camera. In the alternative, first camera $C_1$ may measure depth using a technique such as infrared or sonar. First camera $C_1$ is oriented so that its field of view surrounds the camera's optical axis $A_1$. The field of view has a vertex at a viewpoint $V_1$ which may be a point on axis $A_1$ and considered to coincide with the first position.

First camera $C_1$ may capture a first image of a scene including one or more objects O. The first image may be represented by a first point cloud, which is provided to an image processing apparatus 10. A point cloud is generally defined as a set of data points in some coordinate system. In embodiments of the present technology, each point of the point cloud represents an image element such as a pixel, and may be characterized with a gray level or a luminance/color value, and also a depth value, to thereby form a 3D point cloud. Object O has feature points such as $f_i$ and $f_j$. First camera $C_1$ may obtain a depth map of distances between the vertex $V_1$ and the surface points of the scene objects.

If first camera $C_1$ is a stereo camera, it captures both a left image and a right image of the scene. The first point cloud may be a point cloud representing the left image, the right image, or a composite image of the left and right images, With the left and right images, the camera may obtain depth information of objects in the scene using a disparity map based on differences in positions of common points in the left and right images. Such depth information may be relative to the coordinates of the viewpoint $V_1$.

A second depth camera $C_2$, which may also be a stereo camera, may be located at a second position $x_2$, $y_2$, $z_2$ corresponding to a second viewpoint $V_2$, and may capture a second image of the same scene while being oriented along a second optical axis $A_2$. Alternatively, instead of a second camera $C_2$, the same camera $C_1$ has moved to the second position $x_2$, $y_2$, $z_2$ and captures the second image. (Hereafter, camera $C_2$ is understood to refer to the second camera or to the first camera having moved to the second position.) Camera $C_2$ may likewise capture depth information using a disparity map based on left and right images. In either case, a second point cloud representing the second image is provided to image processing apparatus 10. The second point cloud may likewise be a point cloud of a left image, a right image or a composite image of the left and right images taken by camera $C_2$. Additional images of the scene from different perspectives may be captured by the camera(s), and additional point clouds obtained, following movement to different viewpoints. Although shown separately, first camera $C_1$, second camera $C_2$, image processing apparatus 10, user interface 12 and display device 14 may all be part of a common electronic device such as a portable communication device or a medical imaging apparatus.

Image processing apparatus 10 may utilize the enhanced ICP-based processing according to the techniques described herein to generate at least one coordinate-transformed point cloud. For instance, the second point cloud may be coordinate-transformed based on the ICP processing, so that it may be precisely aligned with the first point cloud. Since camera $C_2$ is situated at the second position, it is translated by a distance t relative to the first position, where t is a vector distance between $V_2$ and $V_1$, or $(x_2-x_1)$, $(y_2-y_1)$, $(z_2-z_1)$. Note that the coordinates of the viewpoints $V_1$ and $V_2$ may not be initially known, so they are just initially approximated. Further, at the time of image capture, the second camera $C_2$ may have been rotated by a rotation R with respect to the optical axis $A_1$ of the first camera $C_1$, i.e., the optical axis $A_2$ of the second camera $C_2$'s field of view is rotated with respect to the axis $A_1$. Hence, the rotation R may be a vector rotation having components along three orthogonal axes. The coordinate-transformed point cloud may be transformed by the ICP processing in terms of R and t, with six degrees of freedom—three for the rotation and three for the translation. For instance, the ICP processing may result in the second point cloud having some or all of its points shifted based on computed values for R and t. Image processing apparatus 10 may output the transformed point cloud to a database and/or to a display 14.

In addition, image processing apparatus 10 may build a database of transformed point clouds, and may also generate 3D rendered images based on the transformed point clouds. For instance, once at least the first and second point cloud images have been captured and aligned using ICP-based processing, image processing apparatus 10 may perform panoramic or other combinatorial image processing to build a database of 3D rendered composite images representing the scene/object(s) 0 from more than two viewpoints. A user interface 12 may thereafter allow a user to view a rendered image from a selected viewpoint on display 14.

Methods and apparatus in accordance with the present technology described below have been conceived with the aim of alleviating one or more shortcomings of conventional ICP based image processing. For example, ICP needs to find correspondences between points, and is very sensitive to the initialization state. Conventional ICP may generate inaccurate transformations if such initialization is imprecise.

Further, conventional ICP does not converge if the two frames are generated from viewpoints that are too far away from one another, Conventional ICP also may not take occlusion into consideration and does not handle missing points or miscorrespondences very well.

Additionally, in a stereo system, the foreground depth is more accurate than background depth. Thus, with the use of conventional ICP, the background can introduce noise into the system. Furthermore, with previous ICP approaches, correspondences are found via a closest neighbor computation, where two planes with a sliding translation can lead to bad matches.

The present technology may obviate some or all of the above problems via one or more of: (i) improved initialization via features point matching; (ii) weighting the contribution of each pixel as a function of its depth; (iii) ignoring points located on a plane or whose closest point is too far away; and (iv) incorporating gray level information in the matching algorithm. Specific embodiments to achieve one or more of these ends will now be described.

FIG. 2 is a flow chart illustrating an illustrative computer-implemented image processing method, 100, that processes image point clouds in accordance with an embodiment. The method involves an enhanced ICP process that may be used for computing a rotation and translation of the camera(s) between first and second image frames captured from different viewpoints. The method first obtains 102 first and second point clouds P and P' representing respective first and second image frames. These point clouds may be obtained from one or more stereo cameras or image sensors imaging a common object(s) or scene from different viewpoints, e.g., as in the environment illustrated in FIG. 1. In other cases, the point clouds may be obtained by other suitable means, such as over a network from a remote source.

Depth regularization may then be performed 104 on each of the first and second point clouds. This operation may serve to remove noise and implement an edge preserving smoothing of an input depth map associated with a point cloud. For instance, in the case of stereo cameras, stereo systems provide a disparity map between two input pictures. The real depth is inversely proportional to the disparity, so that the farther away the imaged object is from the camera, the smaller is the disparity. Thus, the disparity map provides a depth map for the points in each image. Disparity is discrete, and would typically lead to stratification of the obtained depth map if depth regularization were not performed.

The following optimization problem may be solved in accordance with the present technology to carry out the depth regularization and generate smooth edge preserving depth:

$$\min_{\tilde{d}} \int (|\tilde{d}(x)-d(x)|+\mu |\nabla \tilde{d}(x)| G(|\nabla d(x)|)) dx. \qquad \text{(eqn. 1)}$$

In eqn. 1, x may represent a pixel coordinate or count of an input depth map, where the integration is performed over the range (dx) of x in a point cloud or image frame. d(x) represents a depth value at a position x of the input depth map. The term $\tilde{d}(x)$ represents a modified (i.e., regularized) depth value at the position x. After eqn. 1 is solved, the modified depth values $\tilde{d}(x)$ over the range of x may be substituted for d(x) in the subsequent ICP processing. The norm $|\tilde{d}(x)-d(x)|$ is thus indicative of the closeness of the modified depth values to the original depth values.

Eqn. 1 is solved when a set of $\tilde{d}(x)$ over the range of x is obtained, or an expression for $\tilde{d}(x)$ is obtained, that generates a minimum result for the integration function over dx. The resulting set of $\tilde{d}(x)$ may optimally provide a depth map which is less noisy than the original one, but with sharp edges preserved between objects at different depths. In eqn. 1, the symbol $\nabla$ represents a gradient of the argument, and $|\nabla d(x)|$ represents a change in depth at a pixel coordinate x relative to the depth at one or more adjacent pixel coordinates. For a high noise depth map, $|\nabla d(x)|$ is on average higher than that for a low noise depth map, due to the noise artificially changing the depth values throughout the point cloud. The integration of $|\nabla d(x)|$ over the range of x is thus higher for the high noise depth map. The integration of $|\nabla \tilde{d}(x)|$ may be minimized over the range of x in the solution of eqn. 1, so as to minimize total overall pixel to pixel depth variation (e.g. in a 2D image frame). Also, it may be desirable to minimize the norm $|\tilde{d}(x)-d(x)|$ integrated over dx as part of the solution to eqn. 1. With this approach, when a large difference in depth exists between adjacent pixel coordinates, this difference is recognized as a difference between two objects close and far, rather than as noise. Thus, large changes in $\tilde{d}(x)$ are not made under this condition, so as to preserve strong edges between the objects. On the other hand, noise may be recognized (and reduced through processing based on the algorithm) when the depth change between adjacent pixels is relatively small.

The symbol µ denotes a constant, and $G(|\nabla d(x)|)$ is preferably a decreasing function of the input (the gradient of the depth at x), e.g., a function inversely proportional to the gradient $|\nabla d(x)|$. As an example, $G(|\nabla d(x)|)$ may be set as $1/(|\nabla d(x)|)$. Thus, if the gradient $|\nabla d(x)|$ is relatively large, $G(|\nabla d(x)|)$ is relatively small, and vice versa. With these considerations, eqn. 1 may be solved to thereby transform the input depth map into a regularized depth map comprised of a set of regularized depth values $\tilde{d}(x)$ over the range of x. The optimization problem may be solved with processing using a Euler Lagrange algorithm approach or an equivalent.

It is also possible to use another layer of filtering in conjunction with the regularization performed according to eqn. 1. For instance, a Kalman filtering process may be additionally used.

Figure 3A:
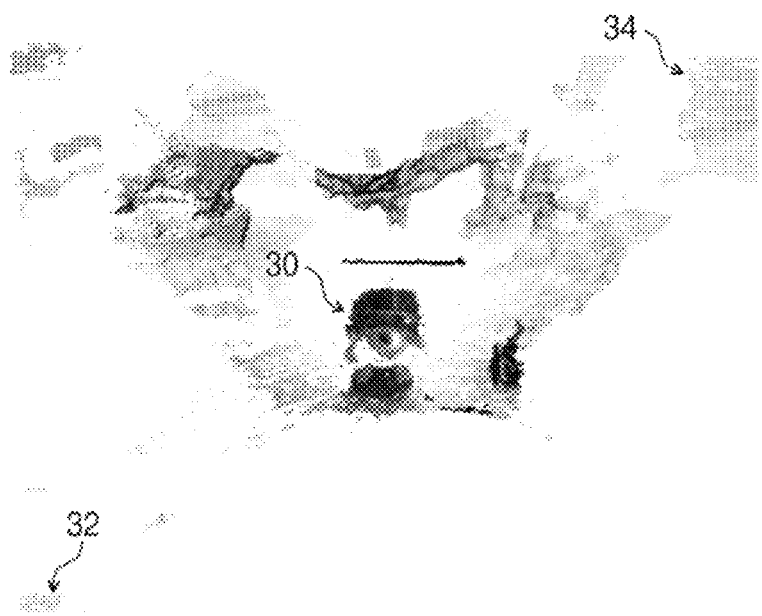
FIG. 3A depicts an experimental point cloud.
Figure 3B:
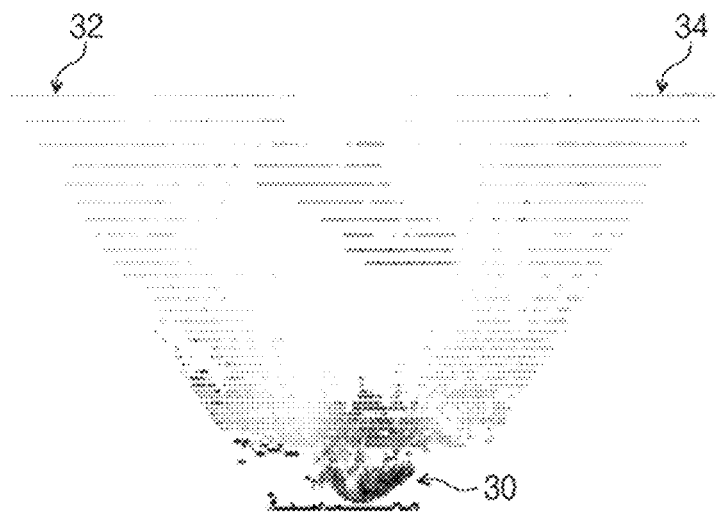
FIG. 3B is an experimental disparity map of a point cloud without regularization.
Figure 3C:
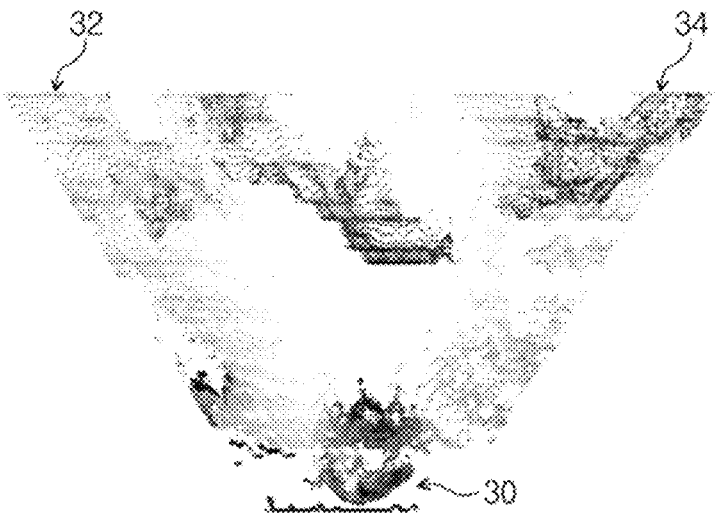
FIG. 3C is an experimental disparity map of a point cloud with regularization.

By way of example, FIG. 3A shows a simulated point cloud image to exemplify an image captured with a stereo camera. An object 30 is assumed to be relatively close to the camera viewpoint, i.e. situated at a shallow depth, whereas scene elements 32 and 34 are assumed to relatively far. FIG. 3B depicts an experimental disparity map of the point cloud image of FIG. 3A without regularization. Dark areas of the disparity map indicate the presence of objects that are relatively close to the viewpoint, while bright areas indicate objects relatively far away from the viewpoint. It is seen that this map is significantly stratified. On the other hand, after smoothing with processing based on eqn. (1) above, a smoother disparity map as shown in FIG. 3C is generated. Exemplary relative depth levels of scene elements 30, 32 and 34 are illustrated in each figure.

Referring still to FIG. 2, a feature points extraction process is performed 106 following the depth regularization. As noted earlier, a conventional ICP algorithm is very sensitive to the initial conditions since the correspondences are found by taking the closest points; and this can lead to mismatches and to a local minima trap in the convergence. Accordingly, in the present embodiment, feature points extraction and matching is performed during an initialization process to improve initial alignment of the point clouds. The feature points extraction entails finding matching keypoints between the first and second point clouds (i.e., between two frames). Feature point matching between two frames may be done with a standard method, of which some examples include the use of scale-invariant feature transform (SIFT), or speeded-up-robust-features (SURF) point/key and matching.

Following feature points extraction, a guided ICP process 108 is performed to derive a rotation and translation of the second point cloud with respect to the first. An example process is described in reference to FIG. 4. The guided ICP process 108 may generally involve determining rotation and translation differences between the matching feature points using depth-based weighting, as part of an iterative closest point (ICP) initiation process. Thereafter, further ICP processing of the first and second point clouds is performed based on results of the initiation process, to generate at least one coordinate-transformed point cloud, i.e., an adjusted point cloud in which at least some of the points are moved. The adjusted point cloud and an updated camera position may be output at 110.

Figure 4:
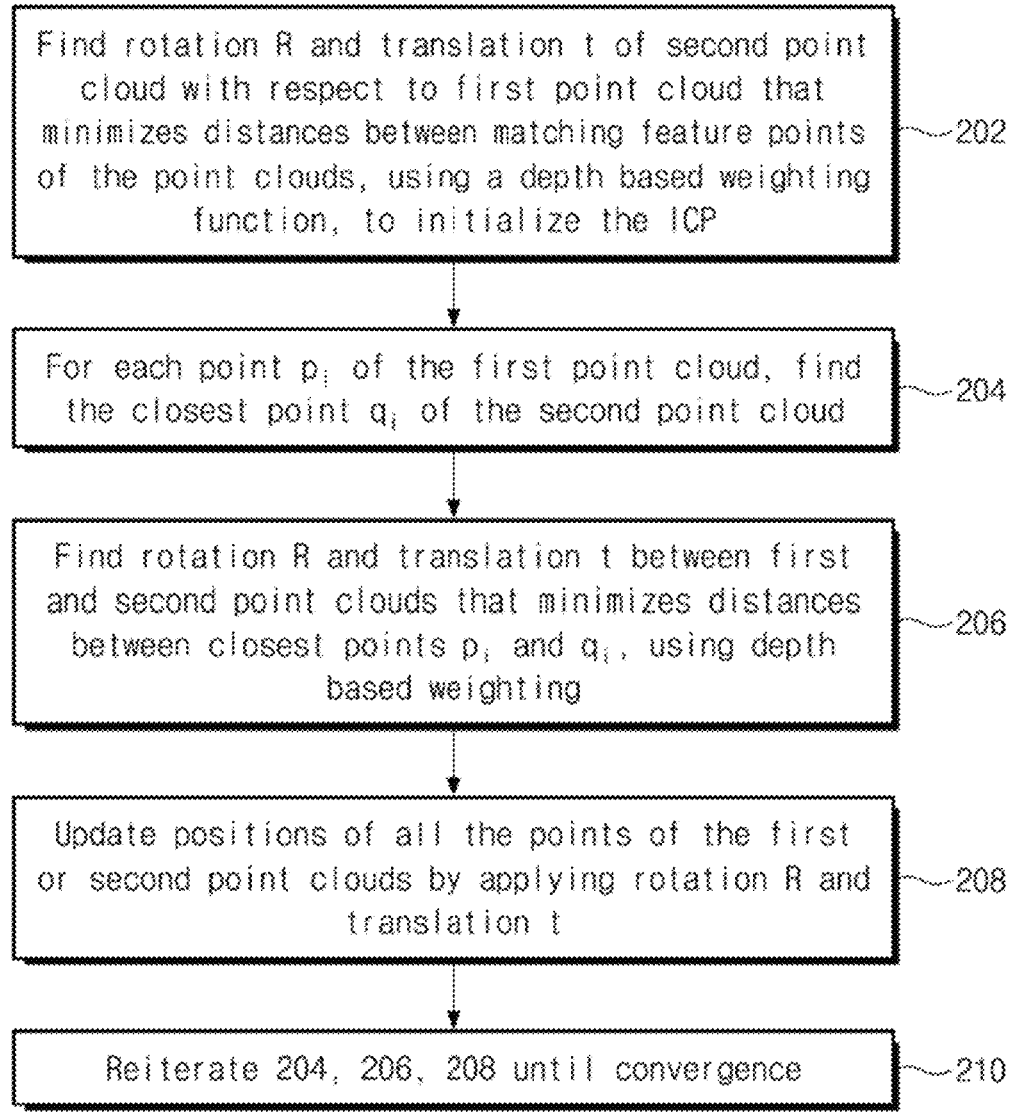
FIG. 4 is a flow chart of an example ICP processing method according to an embodiment of the present technology.

FIG. 4 is a flow chart of an example computer-implemented method that implements processing operations in the feature point extraction 106 and the ICP process 108 of FIG. 2. The method is based in part on the recognition that, considering depth of image elements captured in a stereo camera system, the precision of the depth is inversely proportionate to the depth itself. Hence, points located relatively far away from the camera should be noisier and should have a reduced influence on the criterion desired to be minimized. Therefore, the contribution of the points may be scaled as a function of the depth, whereby a weighting scheme based on depth is provided.

Accordingly, in operation 202, the method finds initial values for rotation R and translation t of the second point cloud with respect to the first point cloud, or vice versa, that minimize distances between matching feature points extracted from the first and second point clouds, so as to initially align the first and second point clouds and initialize the overall ICP process. The rotation and translation between the point clouds are preferably computed using a depth based weighting function, where feature points closer to the viewpoint of the associated point cloud (having shallower depths) are weighted higher than those further away. More specifically, in an original image I from where a first point cloud P is extracted, the method may first find features points $f_i$ using a SIFT key-point detector. The same may be done on an image I' from which a second point cloud P' is extracted, to create feature points $f_i'$. The feature points may be defined in the image in P by $p_i^f$, and in the image in P' by $p_i^{f'}$.

Next, the process may match $p_i^f$ and $p_i^{f'}$ such that $p_i^f$ corresponds to the closest matching feature point in p'. The matching feature points are hereafter denoted $p_{m(i)}^f$ and $p_{m(i)}^{f'}$. The feature point matching may take gray levels or pixel colors of the points into account. The number of matching feature points, which are subsequently used in the ICP initialization for initial alignment of the point clouds, is typically several orders of magnitude smaller than the number of points in each point cloud. For instance, in an example, the initialization may only use 10-20 feature points, whereas a point cloud may contain hundreds or thousands of points.

Thereafter, the process may find initial rotation R and initial translation t that minimizes distances between the matching feature points using a depth based weighting function. For instance, initial values of R and t may be found to minimize an average or median distance between corresponding matching feature points of the first and second point clouds. To this end, an optimization routine to compute optimum values of R and t may be run to find a minimum of the following expression:

$$\Sigma_i w(d_i^f)[Rp_{m(i)}^f + t - p_{m(i)}^{f'}]^2 \quad (2)$$

where w(•) is a predetermined decreasing function, and $d_i^f$ is the depth of the matching feature point $p_{m(i)}^f$ and is preferably a depth $\tilde{d}_i^f$ for the feature point, obtained through the regularization process described earlier.

Expression (2) may be understood as follows: assume $p_{m(i)}^f$ is a first point located at coordinates referenced to an origin of the first point cloud, where the origin may be the viewpoint ($V_1$ or $V_2$) of the point cloud. When a "rotation is applied" to the first point, which is expressed as $Rp_{m(i)}^f$, a vector beginning at the origin and ending at the first point $p_{m(i)}^f$ is rotated by R. This results in the first point being shifted to another point in space coinciding with the end point of the rotated vector, and defined by another set of coordinates. The shifted point is then shifted again by the translation t (so that the first point can be considered "twice shifted"). The position of the matching feature point $p_{m(i)}^{f'}$ of the second point cloud is assumed for the sake of comparison to also have coordinates referenced to the same reference origin (e.g. the viewpoint). The distance between the location of the twice shifted point and that of the matching feature point $p_{m(i)}^{f'}$ of the second point cloud is then determined.

The expression $Rp_{m(i)}^f + t - p_{m(i)}^{f'}$ therefore represents the distance between: (i) the location of the first feature point of the first point cloud, after being twice shifted via applied rotation and translation; and (ii) the location of the matching feature point of the second point cloud. This distance is squared, and the square is multiplied by the depth-based weighting variable $w(d_i^f)$. The calculation is repeated for every matching feature point pair, and the results are summed. An optimization process finds optimum initial values of R and t to arrive at a minimum for the summed results. The initial rotation R and translation t may then be applied to all the points of the first or second point clouds to set up a preliminary alignment of the two point clouds.

Thus, in accordance with an embodiment of the present technology, the ICP process is initialized in a manner that uses depth weighting of the matching feature points, thereby initially aligning (or approximately aligning) the first point cloud with the second point cloud. Feature points closer to the image sensor contribute to the initial alignment with higher weights than those further away.

It is noted here that the weighting in expression (2) may also take occlusions into account. Feature points that are known to be occluded by other image elements in at least one of the images I or I' may be assigned lower weights in comparison to non-occluded points located at the same depths. In other words the weighting function w(•) may be a smaller value in the case of an occlusion.

Following the initialization, at operation 204, for each point $p_i$ of the first point cloud, the closest point $q_i$ of the second point cloud is found. That is, for each point $p_i \in P$, the closest point $q_i = p'_{c(i)} \in P'$ is determined.

The next operation 206 may find, starting from the initial alignment at 202, an incremental change in rotation R and translation t between the first and second point clouds that attains a best depth weighted-based alignment of the point clouds. That is, a further rotation R and translation t may be found which, when applied to all the points $p_i$ or $q_i$ of the first or second point clouds, substantially aligns the two point clouds by minimizing an average or median distance between the respective closest points $p_i$, $q_i$. More specifically, this operation may find rotation R and translation t in a depth-weighted manner that minimizes the following expression:

$$\Sigma_i w(d_i, |p_i - q_i|)[Rp_i + t - q_i]^2 \quad (3)$$

where w(x,y) is a decreasing function of (x,y) (where x represents $d_i$ and y represents $|p_i-q_i|$), $d_i$ is preferably a regularized depth of $p_i$ or $q_i$ (or an average regularized depth between pi and qi), and $Rp_i$ represents a "rotation applied to point $p_i$", so as to rotate a vector beginning at a reference origin and ending at point $p_i$, similar to that discussed above for expression (2), where the translation t may be applied after the applied rotation to yield a "twice shifted" point $p_i$. The difference between the twice shifted point $p_i$ and the closest point $q_i$ is then squared and the result multiplied by the weighting function w(x, y).

In expression (3), since w(x, y) is a decreasing function, $w(d_i,|p_i-q_i|)$ applies a weight that is (i) inversely correlated with the depth of $p_i$ and/or $q_i$; and (ii) positively correlated with an alignment metric between $p_i$ and $q_i$. For example, if $p_i$ and $q_i$ are aligned prior to an additional position shift by a further application of R and t, the norm $|p_i-q_i|$) is zero and (x, y) is a relatively shorter vector. Thereby, the weighting factor is higher than for the case of $p_i$ and $q_i$ being misaligned prior to the additional shift.

In an embodiment, w(x, y) may be 0 if $p_i$ is located on a planar surface. (That is, points determined to be located on a planar surface may be given zero weights and thus ignored.) In addition, points that are known to represent occlusions may be assigned lower weights than non-occluded points at the same depth.

When the additional rotation and translation are found at operation 206 based on the optimization routine that minimizes expression (3), positions of all the points of the first (or second) point cloud are then updated (208) by applying the rotation R and translation t to the positions of the points. In the case of the first point cloud being updated relative to the second point cloud, this may be expressed as updating the position of all the points p of P according to $p_{new}=Rp+t$, where $p_{new}$ denotes a coordinate-transformed position for a given point p.

Lastly, the process is reiterated 210 until convergence by repeating operations 204, 206 and 208 until a predetermined metric for convergence is satisfied. The result may be an optimum coordinate-transformation of the points p of one of both of the point clouds. Thus, the points $p_{new}$ are iteratively adjusted until their locations are optimized for an alignment between the first and second point clouds.

Accordingly, various embodiments of the present technology adapt ICP to a stereo system using a depth edge preserving regularization, a smart weighting, and by incorporating gray level information to the framework.

The processing of method 100 may be performed by at least one processor of image processing apparatus 10. The at least one processor may be dedicated hardware circuitry, or, a general purpose processor that is converted to a special purpose processor by executing program instructions loaded from memory.

FIG. 5 is a functional block diagram of an example image processing apparatus 10 according to the present technology. Apparatus 10 includes one or more processors 50 that performs the processing in the above-described methods. Processor(s) 50 may include a depth regularization engine 54, a feature point extraction and matching engine 56 and an ICP processing engine 58. Input point clouds P and P' from one or more stereo cameras or other sources are received by an input interface 52 and provided to depth regularization engine 54. There, the depth maps are smoothed, and the point clouds with smoothed depth maps are provided to feature point extraction and matching engine 56 which may perform the above-described operations 106 and 202. ICP processing engine 58 may perform the guided ICP process 108, involving operations 204, 208 and 210. A memory 60 may be used by one or more of the engines 54, 56 and 58 for necessary storage. Memory 60 may also store program instructions read by and executed by processor(s) 50 to carry out its operations. An output interface 62 outputs coordinate transformed point clouds for displaying and/or further processing (e.g. 3D rendering from selected viewpoints as controlled by a user interface 12 seen in FIG. 1). A database 64 may be used to store output point clouds, 3D rendered images, etc.

Image processing apparatus 10 may be included as part of an electronic device having other functionality (as mentioned earlier in connection with FIG. 1). Some examples of the electronic device include but are not limited to a camera, a medical imaging apparatus, a portable electronic device, a personal computer, a notebook computer, a smart phone, a tablet, a smart TV, a set-top box, and a robot. Any of these examples may include a camera providing the point clouds, where the camera may be a depth camera such as a stereo camera. A portable electronic device may be sized and configured to be easily carried in a typical user's single hand.

In some cases, it may be beneficial to perform ICP processing by utilizing the above-described depth regularization even without the matching and depth-based weighting of the feature points and/or the subsequently processed depth-based weighting of points of the point clouds. In other cases, it may be beneficial to perform ICP processing by utilizing the depth-based weighting of the feature points even without the depth regularization.

Exemplary embodiments of the present technology have been described herein with reference to signal arrows, block diagrams and algorithmic expressions. Each block of the block diagrams, and combinations of blocks in the block diagrams, and operations according to the algorithmic expressions can be implemented by hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block/schematic diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The above-described methods according to the present technology can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An image processing method comprising:
   executing, by at least one processor, instructions read from a memory for:
   obtaining first and second point clouds representing respective images of a scene from different viewpoints, each of the first and second point clouds being a point cloud obtained from a stereo camera;
   performing depth regularization on each of the first and second point clouds and thereafter, matching feature points extracted from the first point cloud with feature points extracted from the second point cloud;
   determining an initial rotation and translation of the first point cloud with respect to the second point cloud to initially align the first and second point clouds, using depth-based weighting of the feature points in which feature points at depths closer to a viewpoint are weighted higher than feature points further from the viewpoint; and
   performing iterative closest point (ICP) processing using the initial rotation and translation, to generate at least one coordinate-transformed point cloud,
   wherein performing the ICP processing comprises performing a depth weighted based alignment of corresponding points of the first and second point clouds, with points at depths closer to a viewpoint being weighted higher than points further from the viewpoint.

2. The image processing method of claim 1, wherein each of the first and second point clouds is a point cloud obtained from a stereo camera.

3. The image processing method of claim 1, wherein the depth regularization is performed by computing a regularized depth $\tilde{d}(x)$ over a range of image element positions x, that satisfies the following expression:

$$\min_{\tilde{d}} \int (|\tilde{d}(x)-d(x)|+\mu |\nabla \tilde{d}(x)| G(|\nabla d(x)|)) dx,$$

where d(x) is a depth value of an image element at position x of an input depth map, $\nabla$ represents a gradient, $\mu$ is a constant, and $G(|\nabla d(x)|)$ is a decreasing function of $|\nabla d(x)|$.

4. The image processing method of claim 1, wherein matching of feature points is based at least in part on gray levels of the feature points in the first and second point clouds.

5. The image processing method of claim 1, wherein the feature points are extracted using scale-invariant feature transform (SIFT) or speeded-up-robust-features (SURF) features point/key and matching.

6. The image processing method of claim 1, wherein said determining an initial rotation and translation comprises determining rotation R and translation t that minimizes $\Sigma_i w(d_i^f)[Rp_{m(i)}^f+t-p_{m(i)}^{f'}]^2$, where $p_{m(i)}^f$ is a matching feature point of the first point cloud, $p_{m(i)}^{f'}$ is a matching feature point of the second point cloud, which matches $p_{m(i)}^f$, $w(\bullet)$ is a decreasing function, $d_i^f$ is depth of the matching feature point and $d_i^f$ is depth of $p_{m(i)}^f$.

7. The image processing method of claim 1, wherein said performing ICP processing includes assigning zero weights to points that are determined to be located on a planar surface.

8. The image processing method of claim 1, wherein said performing ICP processing includes assigning a lower weight to a first point that is part of an occlusion, relative to a weight assigned to a second point having the same depth value.

9. The image processing method of claim 1, wherein the ICP processing includes determining a further rotation R and a further translation t that minimizes the following expression:

$$\Sigma_i w(d_i, |p_i-q_i|)[Rp_i+t-q_i]^2$$

where $p_i$ is a point of the first point cloud, $q_i$ is a point of the second point cloud that is closest to $p_i$, w(x,y) is a decreasing function of (x,y), where x represents $d_i$ and y represents $|p_i-q_i|$, $d_i$ is a depth of $p_i$ or $q_i$, and $Rp_i$ represents a rotation applied to the point $p_i$.

10. An electronic device comprising:
    memory; and
    at least one processor coupled to the memory and executing instructions to:
    perform depth regularization on each of first and second point clouds and thereafter, match the feature points extracted from the first point cloud with the feature points extracted from the second point cloud, wherein the depth regularization is configured to remove noise and implement edge preserving smoothing of an input depth map associated with each of the first and second point clouds;
    determine an initial rotation and translation of the first point cloud with respect to the second point cloud to initially align the first and second point clouds, using depth-based weighting in which feature points extracted from the first and second point clouds at depths closer to a viewpoint are weighted higher than feature points further from the viewpoint; and
    perform iterative closest point (ICP) processing using the initial rotation and translation, to generate at least one coordinate-transformed point cloud, wherein the ICP processing comprises a process of depth weighted based alignment of corresponding points of the first and second point clouds, in which points at depths closer to a viewpoint are weighted higher than points further from the viewpoint.

11. The electronic device of claim 10, further comprising an input interface configured to receive the first and second point clouds from a stereo camera.

12. The electronic device of claim 10, wherein the depth regularization is performed by computing a regularized depth $\tilde{d}(x)$ over a range of image element positions x, that satisfies the following expression:

$$\min_{\tilde{d}} \int (|\tilde{d}(x)-d(x)|+\mu |\nabla \tilde{d}(x)| G(|\nabla d(x)|)) dx,$$

where d(x) is a depth value of an image element at position x of an input depth map, $\nabla$ represents a gradient, $\mu$ is a constant, and $G(|\nabla d(x)|)$ is a decreasing function of $|\nabla d(x)|$.

13. The electronic device of claim 10, wherein:

each of the first and second point clouds is a point cloud obtained from at least one stereo camera; and the ICP processing comprises a process of depth weighted based alignment of corresponding points of the first and second point clouds, wherein points at depths closer to a viewpoint are weighted higher than points further from the viewpoint.

14. The electronic device of claim 10, wherein the ICP processing includes determining a further rotation R and a further translation t that minimizes the following expression:

$$\Sigma_i w(d_i, |p_i - q_i|)[Rp_i + t - q_1]^2$$

where $p_i$ is a point of the first point cloud, $q_i$ is a point of the second point cloud that is closest to $p_i$, $w(x,y)$ is a decreasing function of $(x,y)$, where x represents $d_i$ and y represents $|p_i - q_i|$, $d_i$ is a depth of $p_i$ or $q_i$, and $Rp_i$ represents a rotation applied to the point $p_i$.

15. A system comprising:

at least one camera configured to capture images of a scene from each of first and second viewpoints and obtain, respectively, first and second point clouds corresponding to the scene; and imaging processing apparatus comprising:

memory; and at least one processor coupled to the memory and executing instructions to:

perform depth regularization on each of the first and second point clouds and thereafter, match feature points extracted from the first point cloud with feature points extracted from the second point cloud;

determine an initial rotation and translation of the first point cloud with respect to the second point cloud to initially align the first and second point clouds, using depth-based weighting of the feature points in which feature points at depths closer to a viewpoint are weighted higher than feature points further from the viewpoint; and perform iterative closest point (ICP) processing using the initial rotation and translation, to generate at least one coordinate-transformed point cloud, wherein the ICP processing comprises a process of depth weighted based alignment of corresponding points of the first and second point clouds, in which points at depths closer to a viewpoint are weighted higher than points further from the viewpoint.

\* \* \* \* \*